United States Patent [19]
Rossel

[11] 3,818,303
[45] June 18, 1974

[54] METRIC CONVERSION DEVICE FOR NUMERICAL CONTROL OF MACHINE TOOLS

[75] Inventor: Peter Rossel, Erlangen, Germany

[73] Assignee: Siemens Aktiengesellschaft, Berlin, Germany

[22] Filed: Oct. 18, 1971

[21] Appl. No.: 190,348

[30] Foreign Application Priority Data
Oct. 20, 1970 Germany.......................... 2051305

[52] U.S. Cl......... 318/603, 235/151.11, 235/92 PL, 235/92 DN, 235/92 MP, 318/571, 318/685, 318/696
[51] Int. Cl. .......................................... G05b 19/28
[58] Field of Search.................. 318/603, 685, 696; 235/92 PL; 233/151.11, 92 PL, 92 DN, 92 MP

[56] References Cited
UNITED STATES PATENTS

| | | | |
|---|---|---|---|
| 3,541,417 | 11/1970 | Frank, Jr. ...................... | 318/603 X |
| 3,564,220 | 2/1971 | Peddie ............................ | 235/92 PL |
| 3,588,662 | 6/1971 | Buebel et al.................... | 318/603 X |
| 3,602,698 | 8/1971 | Vigour............................ | 235/92 PL |
| 3,605,000 | 9/1971 | Inaba et al. .................... | 318/603 X |
| 3,621,357 | 11/1971 | Kubo et al. ..................... | 318/603 X |
| 3,648,030 | 3/1972 | Sheperd et al.................. | 235/92 PE |
| 3,705,295 | 12/1972 | Betz................................ | 235/92 PL |

*Primary Examiner*—T. E. Lynch
*Attorney, Agent, or Firm*—Herbert L. Lerner

[57] ABSTRACT

In a numerical machine tool control the control pulses are fed in parallel to an electrohydraulic stepping motor and a presettable backward counter. The null signal of the counter stops the motor. In order to be able to preset the counter in inches with a travel increment of 0.004 inch, the first "decade" of the counter is modified to form a reduction at the ratio of 1 to 2.5.

4 Claims, 1 Drawing Figure

PATENTED JUN 18 1974　　　　　　　　　　　3,818,303
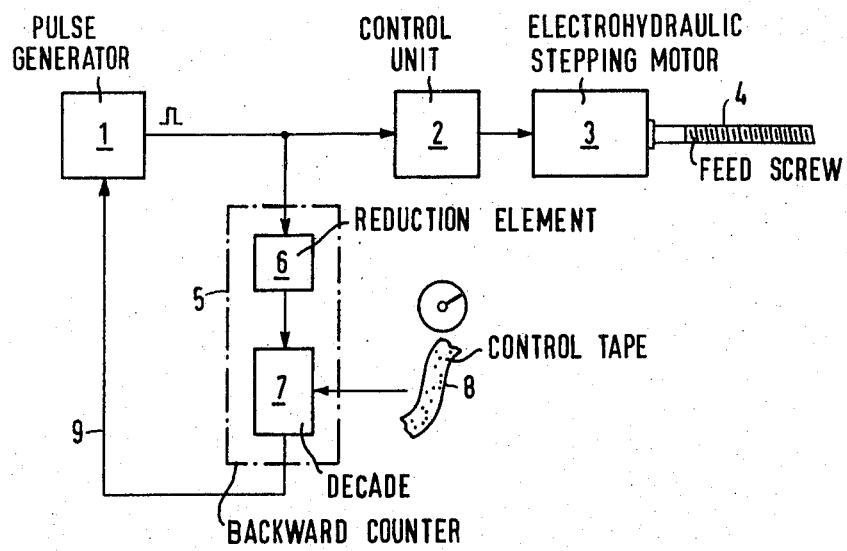

METRIC CONVERSION DEVICE FOR NUMERICAL CONTROL OF MACHINE TOOLS

The invention relates to a device for the numerical control of machine tools. More particularly, the invention relates to a device for the numerical control of machine tools in which the control pulses are fed to an electrohydraulic stepping motor serving as the drive. The control pulses are supplied in parallel with the motor to a counter which is preset according to the desired extent of the travel. The signal of the counter then stops the drive at the desired point.

Numerical controls of the aforedescribed type with input from a measuring chain are known. ("Steuerungstechnik", No. 1, 1968, pages 13 to 18).

Numerical controls of the aforedescribed type with electrohydraulic stepping motors normally have a travel increment of 0.01 millimeter. For this purpose, the machine tools have a reduction gear between the stepping motor and the lead screw which assures this increment with a spindle pitch of 10 millimeters. This increment has been found to be advantageous, since the rapid traverse, which results from the maximum permissible frequency and the travel increment, then assumes justifiable values.

If such machine tools have to be sold in countries using the inch system, without changing the mechanical values substantially, the increment ought to be 0.0004 inch (equal to 0.0116 mm) for a lead screw pitch of 0.4 inch. Since it cannot normally be required that programming should proceed in units and not in inches, the object of the present invention is to develop the device of the aforementioned type in such a manner that an input in inches is possible.

In accordance with the invention, the aforedescribed problem is solved in a control in which the travel increment corresponds to $p$ times one nth of an inch by the feature that the counter which can be preset in one nth inches is designed in such a manner that it generates after p times the number of pulses of the preset value the signal for stopping the drive. It is thereby possible, despite programming in inches, to feed the control pulses as before in parallel to the counter and to the stepping motor. Forward or backward counters may be utilized as the counter, although it is of particular advantage to use a backward counter.

If a decimal counter is used as the backward or reverse counter, the aforedescribed problem may be solved circuitwise relatively easily by letting a counting reduction of $10:p$ take the place of the first decade. Since this reduction can under certain circumstances be an odd number, for example, 1:2.5 ($p=4$), as in the aforedescribed example, it would be desirable to select the reduction as 1:5 and to double the pulses at the output of the reduction section, for example, by additionally taking off a pulse sequence complementary to the counting pulse sequence proper and by correspondingly coding the reduction element.

In order that the invention may be readily carried into effect, it will now be described with reference to the accompanying drawing, wherein the single FIGURE is a block diagram of an embodiment of the device of the invention for numeral control of machine tools.

In the FIGURE, a pulse generator 1 supplies control pulses to the control unit 2. The control unit 2 converts the control pulses into suitable control pulses for an electrohydraulic stepping motor. The control unit 2 is connected to an electrohydraulic stepping motor 3. The electrohydraulic stepping motor 3 drives a feed screw 4 via a transmission unit (not shown in the FIGURE).

Simultaneously, the control pulses of the pulse generator 1 are fed to a backward or reverse counter 5. The backward counter 5 is preset to the desired travel value and has a null signal, transmitted via a line 9, which interrupts the further transmission of control pulses and thereby stops the drive at the desired point. The counter 5 is preset in accordance with the desired travel distance to be run, which is available in the form of chain measures.

The counter 5 is preset by input means 8, for example, perforated tape or tapes, or preferably, decade switches. It may be assumed that the travel increment p times n of the present control should be 0.0004 inch ($n = 0.0001$ inch and $p = 4$). The feed therefore travels a corresponding distance per control pulse. The backward counter 5 must be designed so that $p$ times the number of pulses of the preset value brings the counter to zero, in order to permit the programming of said counter in nths of inches.

In the present example, the first decade of the decimal counter 5 must therefore be replaced by a reduction element 6 which, in lieu of a reduction of 1:10, provides a reduction of 1:2.5 so that four times ($p=4$) the number of pulses is fed to the following decade 7 than in the case of the decade design.

The reduction of 1:2.5 can be achieved by making the reduction element having a reduction ratio of 1:5, for example, in the form of a shift register and by doubling the pulses transmitted to the next decades 7 at the output, for example, by additional evaluation of the complementary transmitted pulse sequence. The desired travel magnitude to be set into the backward counter 5, for example, in the binary coded decimal form, may also deviate from zero in the lowest decade digit. Therefore, provision must further be made through code correction that the travel magnitude be converted into a value suitable for the reduction element 6 which has replaced the first decade.

The presetting, for example, by means of a decade switch, does not avoid errors. It is therefore desirable to design the control further in such a way that the remainder which is not divisible by p is suppressed by making the zero interrogation effective for all magnitudes smaller than the product pn.

While the invention has been described by means of a specific example and in a specific embodiment, I do not wish to be limited thereto, for obvious modifications will occur to those skilled in the art without departing from the spirit and scope of the invention.

I claim:

1. A device for numerical control of machine tools having an electrohydraulic stepping motor driving a machine tool and a source of control pulses connected to the motor for supplying control pulses thereto, said device comprising a counter connected to the source of control pulses, said counter having an input being supplied control pulses from the source of control pulses in parallel with the motor, the counter being preset in accordance with a predetermined desired travel magnitude and producing stop signal for stopping the production of control pulses by the source of control pulses and thereby halting the driving of the machine tool at the desired magnitude, each travel increment which may be realized by a control pulse corresponding to p times one nth of an inch, said counter being presettable in nths of inches and producing the stop signal after p times the number of pulses of the preset magnitude at the input of the counter.

2. A device as claimed in claim 1, wherein the counter comprises a background counter for producing a null signal which is the stop signal.

3. A device as claimed in claim 2, wherein the backward counter comprises a reduction element having a reduction ratio of 10:p instead of a first decade decimal counter stage.

4. A device as claimed in claim 3, wherein the reduction element has a reduction ratio of 1:5 and produces a doubled number of pulses.

* * * * *